United States Patent [19]

Ojima et al.

[11] 4,007,364
[45] Feb. 8, 1977

[54] WRITING INSTRUMENT WITH CALCULATOR

[75] Inventors: Shin Ojima; Kazuhiko Ohgami; Kazutaka Watanabe; Tohru Yoshimura; Masaya Katou; Nozomu Matsuoka, all of Yao, Japan

[73] Assignee: Hoshidenki-Seizo Kabushiki Kaisha, Osaka, Japan

[22] Filed: Apr. 28, 1975

[21] Appl. No.: 572,561

[30] Foreign Application Priority Data

| | | |
|---|---|---|
| May 2, 1974 | Japan | 49-50998[U] |
| June 6, 1974 | Japan | 49-65626[U] |
| July 8, 1974 | Japan | 49-80499[U] |

[52] U.S. Cl. ............................................. 235/152
[51] Int. Cl.² ...................................... G06F 3/02
[58] Field of Search ............... 235/152, 156, 64; 340/172.5

[56] References Cited

UNITED STATES PATENTS

| | | | |
|---|---|---|---|
| 3,147,915 | 8/1964 | Cresswell, Jr. | 235/64 X |
| 3,376,551 | 4/1968 | Armbruster | 340/172.5 |
| 3,617,708 | 11/1971 | Bongiovanni | 235/64 |
| 3,852,952 | 12/1974 | Vittoz et al. | 235/156 X |
| 3,937,939 | 2/1976 | Frenkel | 235/156 |

*Primary Examiner*—David H. Malzahn
*Attorney, Agent, or Firm*—Pollock, Vande Sande and Priddy

[57] ABSTRACT

A writing instrument internally houses a miniature electronic calculator which includes a key input section comprising a single key which is subjected to a rotational or translational movement to select one of a plurality of switches. When the key is depressed against a bias applied thereto while in a position in which it has selected one of the switches, the selected switch is controlled thereby to input an associated information into an arithmetic unit of the calculator. The instrument case or key is marked with indicia which designate the key positions for the convenience of selecting input informations. The key input section comprises an insulating substrate on which an array of a plurality of stationary contacts are formed along the direction of movement of the key, a flexible insulating film disposed in opposing relationship with the stationary contacts, and a movable contact deposited on the side of film which faces the stationary contacts so as to extend in the direction of movement of the key. The depression of the key causes a localized portion of the movable contact to bear against one of the stationary contacts, thus forming a switch.

10 Claims, 18 Drawing Figures

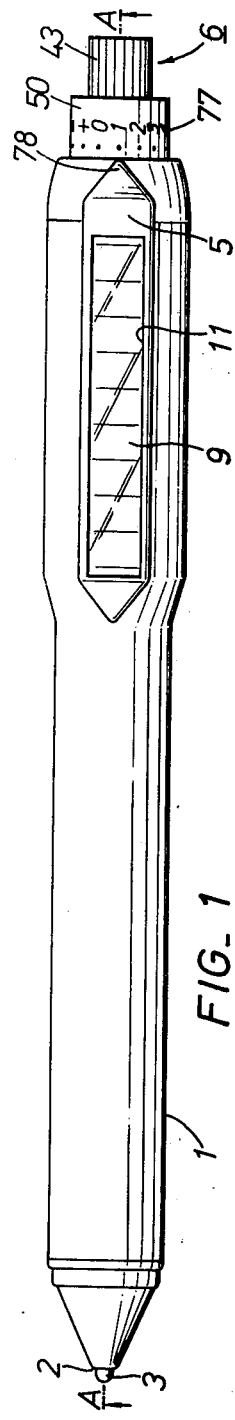
FIG_1
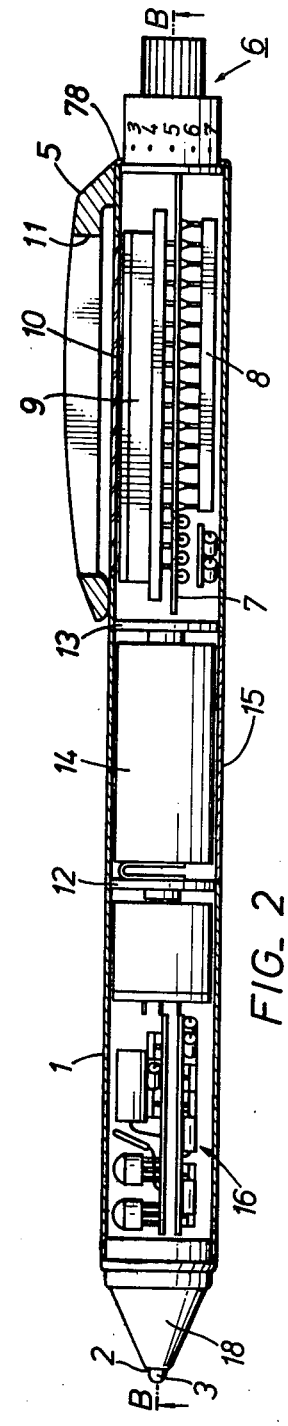
FIG_2
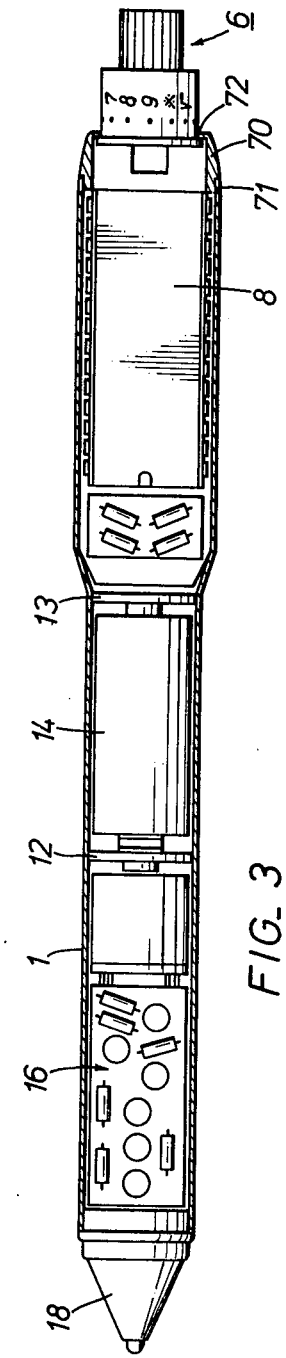
FIG_3

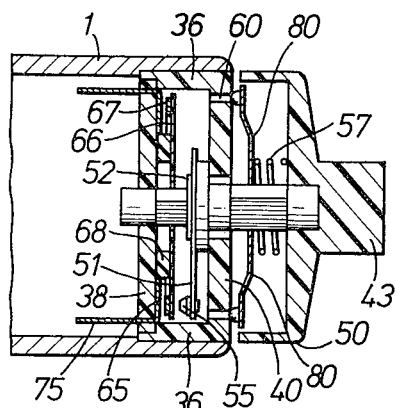
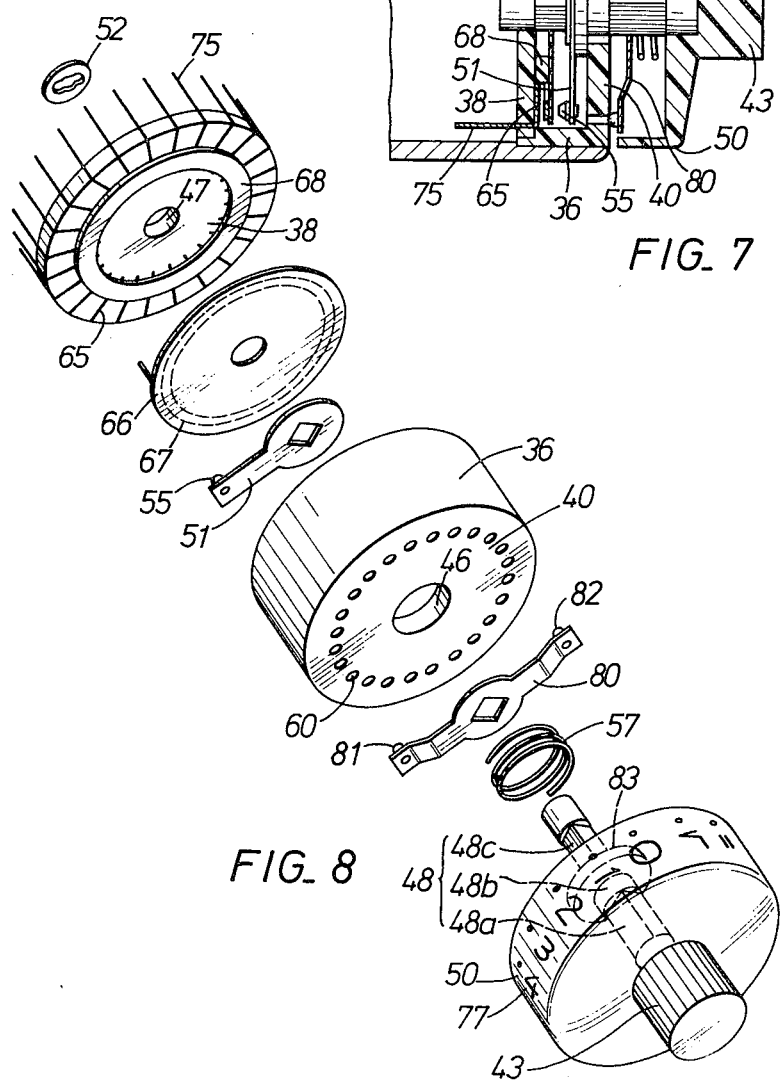

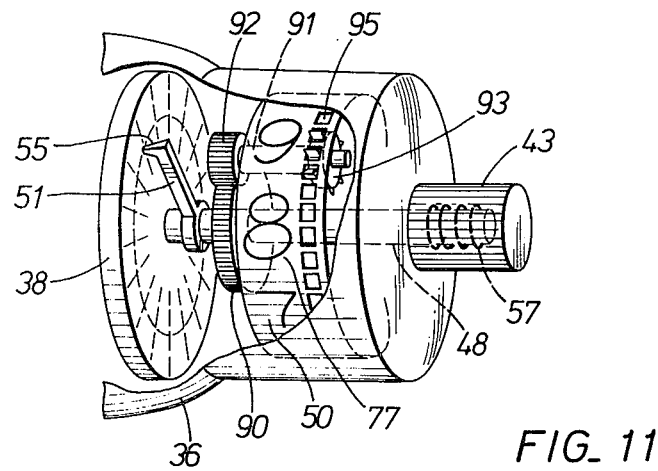
FIG_ 11
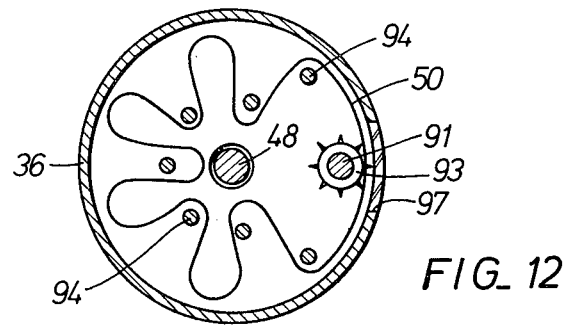
FIG_ 12
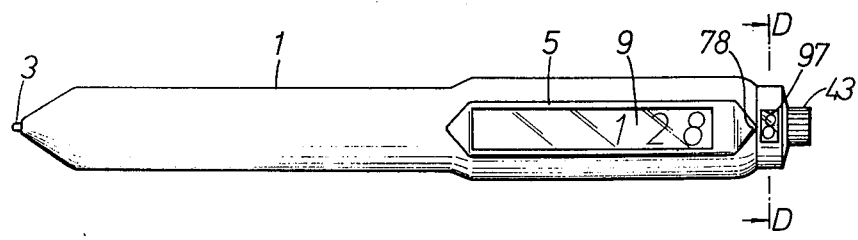
FIG_ 13

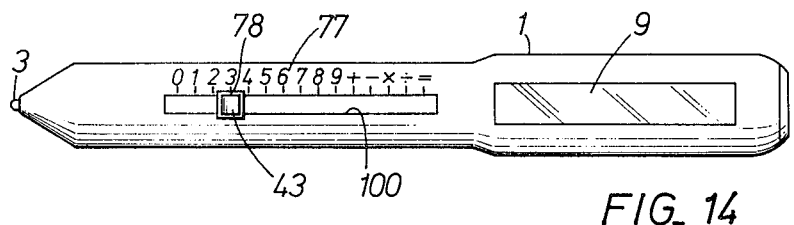
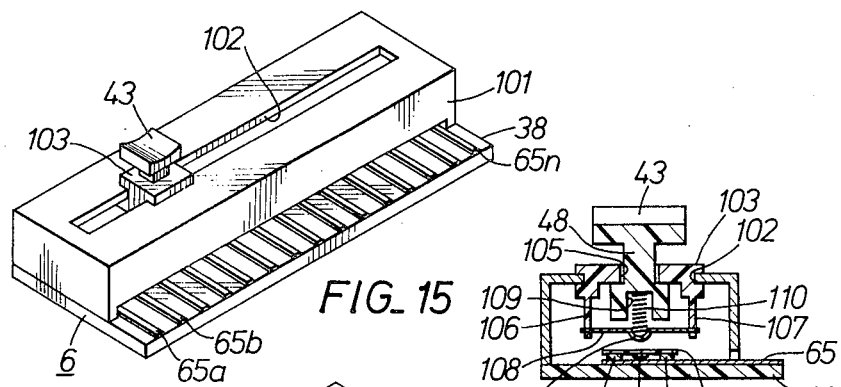
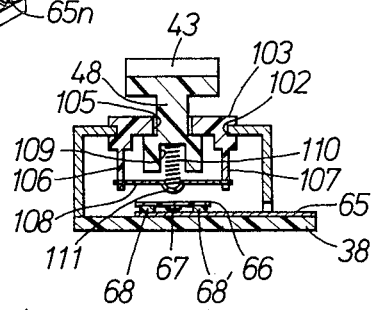
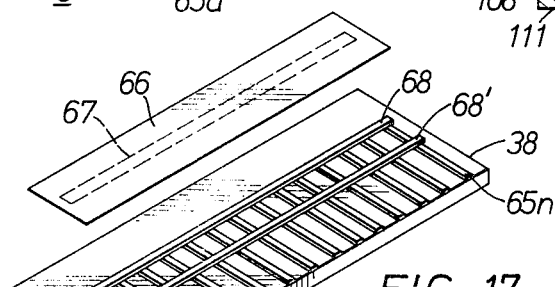
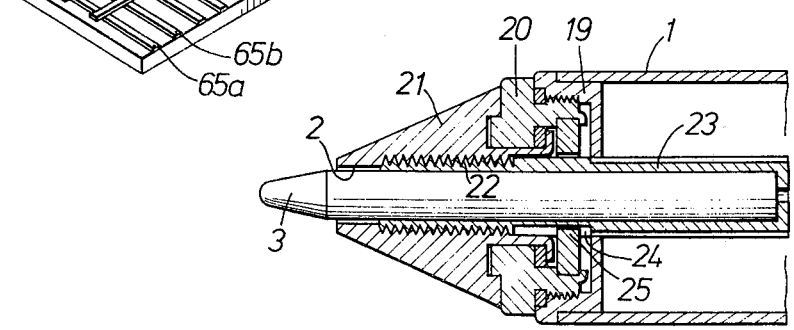

WRITING INSTRUMENT WITH CALCULATOR

BACKGROUND OF THE INVENTION

The invention relates to a writing instrument internally housing a miniature electronic calculator which performs an arithmetic operation on numeral data inputted by a key operation.

A conventional desk-top electronic calculator includes ten numerical keys which permit an entry of numbers from 0 to 9, and a plurality of functional keys which choose a selected function. These keys are selectively operated for an intended operation. Because of the number of keys which must be provided, reducing the size of these keys and disposing them closer together for providing a compact calculator results in an increased likelihood of inadvertent entry of information as by operating unintended keys which are located adjacent to an intended key. Thus a miniaturization of the desktop electronic calculator has been limited by the requirements imposed on keyboard switches. It will be convenient if a calculator could be internally housed within a writing instrument since then the result of calculation can be immediately recorded with the writing instrument and since a writing instrument represents an article which a person usually carries about, thus providing a portable calculator. However, a conventional keyboard switch is too large to house an electronic calculator within a writing instrument.

Therefore, it is an object of the invention to provide a writing instrument which internally houses an electronic calculator.

It is another object of the invention to provide a writing instrument with an electronic calculator having a key input section which permits a selective entry of various kinds of information with a single key.

It is a further object of the invention to provide a writing instrument with an electronic calculator which permits a rapid and correct entry of information.

SUMMARY OF THE INVENTION

In accordance with the invention, an elongate case houses a pen body at one end, and also houses a key input section, an arithmetic unit formed of a semiconductor integrated circuit and performing an arithmetic operation on information which is inputted by the input section, a display of luminscent diodes formed of an integrated circuit and for displaying the result of an arithmetic operation, and a power source for driving the display and the arithmetic unit. The key input section includes a key which is arranged for rotational or translational movement so as to select input information in accordance with the position to which it is moved, by selecting one of a plurality of switches. The depression of the key controls the selected switch to input the selected information into the arithmetic unit. In this manner, a plurality of switches are disposed in an array along the direction of movement of the key. To provide these switches, an array of a plurality of stationary contacts are formed of an insulating substrate in the direction of movement, and overlying the substrate is a flexible insulating film on which is deposited an elongate movable contact on its side facing the substrate, the movable contact extending in the direction of movement. Spacers of an insulating material are interposed at intervals between the movable and stationary contacts so that the movable contact is normally maintained clear of any of the stationary contacts. The movable contact is selectively engaged with one of the stationary contacts by moving the key to a desired position to choose one of the stationary contacts and depressing the key to urge a localized region of the film toward the substrate. When the key is released, the bias applied to the key causes it to return, thereby causing stability of the film to move the movable contact away from the selected stationary contact. In order to indicate the position of selected input information, one of the key or any member moving therewith and the peripheral surface of the case is provided with an array of indicia representing the input information, while the other is marked with an index. For a key which is to move along a rectilinear path, the case is provided with an array of indicia along the direction of the movement while the key is marked with the index. In order to permit a user to feel a selected position, an array of recesses is formed in a stationary member along the direction of movement of the key, while a movable member contains a ball partly engaging the recesses and means for urging the ball toward the recesses, thus forming a detent mechanism so as to permit the position of a desired input information to be rapidly and accurately established.

BRIEF DESCRIPTION OF THE DRAWINGS

FIG. 1 is a plan view of the writing instrument with electronic calculator according to the invention;

FIG. 2 is a cross section taken along the line A—A shown in FIG. 1;

FIG. 3 is a cross section taken along the line B—B shown in FIG. 2;

FIG. 7 is a cross section showing another example of the key input section;

FIG. 8 is a exploded perspective view of the key input section shown in FIG. 7;

FIG. 11 is a perspective view of another example of the display in the key input section;

FIG. 12 is an enlarged cross section taken along the line D—D shown in FIG. 13;

FIG. 13 is a plan view of the writing instrument with an electronic calculator which incorporates the display shown in FIG. 11;

FIG. 14 is a plan view of a further embodiment of the writing instrument with an electronic calculator according to the invention;

FIG. 15 is an enlarged perspective view of the key input section of the calculator shown in FIG. 14;

FIG. 16 is a fragmentary cross section of the key shown in FIG. 15;

FIG. 17 is an exploded perspective view of the substrate and film; and

FIG. 18 is a cross section illustrating a specific example of a pen mounting structure.

DETAILED DESCRIPTION OF PREFERRED EMBODIMENTS

Figure 4:
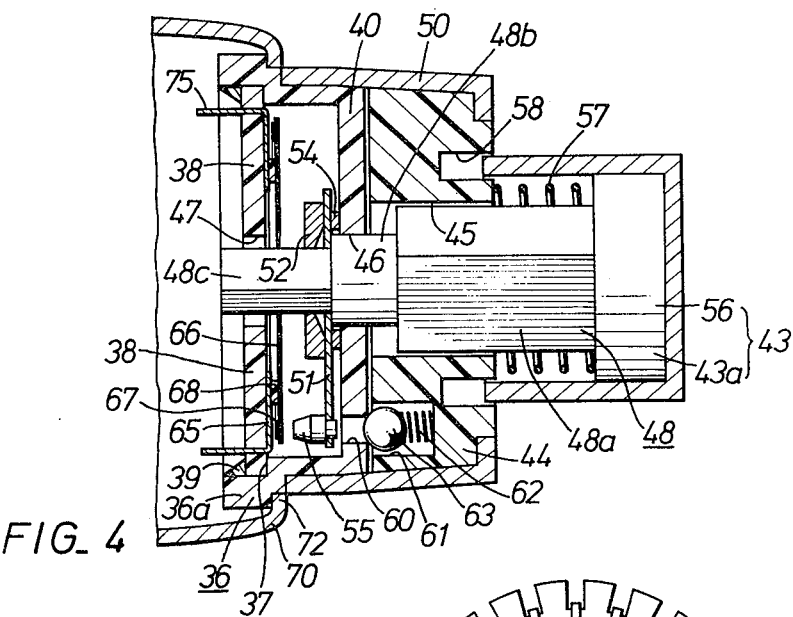
FIG. 4 is an enlarged cross section of the key input section.

Referring to FIGS. 1 to 3, there is shown a rod-shaped elongate case 1 which is tapered at one end, in the end face of which is formed an aperture 2 for providing access for a pen point 3 of a ball-point pen. At its other end, the case 1 has a clip 5 secured thereto for retaining the case 1 in a pocket of clothes.

In accordance with the invention, the writing instrument internally houses an electronic calculator. A key input section 6 for inputting numerical data and arithmetic functions is located in the opposite ends of the case 1 which is remote from the pen point 3. Toward this end, the case 1 is centrally provided with a wiring board 7 which extends along the length of the case 1, and an arithmetic unit 8 formed of a semiconductor integrated circuit and performing an arithmetic operation on the information inputted from the key input section 6 is mounted on one side of the board 7, while a display 9 formed by an integrated circuit including luminescent diodes and displaying the inputted numbers and the result of the arithmetic operation is mounted on the opposite side of the board 7. A display window is formed in the case 1 at a position opposite to the display 9, and is covered with a transparent panel 10. In the example shown, the display window is located opposite to the clip 5, which is formed with an elongate slot 11 lengthwise thereof to permit the indication of the display 9 to be viewed therethrough. The intermediate portion of the case 1 is divided by partitions 12, 13 to form a battery housing for containing a battery 14 therein. In the region of the battery housing, part of the case 1 which extends around one-half the circumference thereof is formed as an openable cover 15 for permitting replacement of the battery 14. A d.c.-d.c. converter 16 is received within the case 1 adjacent to the penside of the battery housing, and converts the output voltage from the battery 14 to a desired voltage level which is supplied to the arithmetic unit 8 and the display 9.

A pen mounting structure 18 is located adjacent to one end of the converter 16 as illustrated in FIG. 18. The pen mounting structure 18 may comprise a cup-shaped coupler 19 secured to the end of case 1 which is remote from the key input section 6 so as to close it, with a retaining ring 20 being externally screwed onto the cup portion of the coupler 19. A conical member 21 is rotatably mounted on the retaining ring 20, and has a threaded hole 22 extending therethrough along the axis thereof. A cylindrical pen holder 23 is threadably engaged with the threaded hole 22. Intermediate its length, the holder 23 is formed with a longitudinal groove 24 which extends parallel to the axis, and a locking element 25 secured to and extending from the retaining ring 20 is positioned within the longitudinal groove 24. The pen point 3 is fitted into the holder 23 to be retained thereby. When the conical member 21 is rotated, the threaded engagement between the member 21 and the holder 23 as well as the provision of the locking element 25 and the longitudinal groove 24 permit the holder 23 to move axially to thereby advance or retract the pen point 3. By disengaging the retaining ring 20 from the coupler 19 and disengaging the holder 23 from the retaining ring 20, the pen point 3 within the holder 23 can be replaced.

The key input section 6 may be formed as shown in FIG. 4, for example. A cylindrical frame 36 having a short axial length has an increased inner diameter at one end to form a shoulder 37, and a circular printed substrate 38 has its periphery disposed in abutting relationship with the shoulder 37 so as to close said one end of the frame 36. The frame 36 may be formed of a synthetic resin material, for example, so as to permit a portion thereof to be heated and melted to provide a detent 39 which secures the substrate 38 against the shoulder 37. The other end of the frame 36 is integrally formed with an end plate 40 in which a key 43 is rotatably mounted in order to select a particular switch by rotation and to control the selected switch by axial movement. At this end, a rotary member 44 is disposed adjacent to that surface of the end plate 40 which is remote from the substrate 38, and a shank 48 of the key 43 is loosely fitted into a through-opening 45 formed in the rotary member 44, through a central opening 46 in the end plate 40 and through a central opening 47 in the printed substrate 38. These openings 45, 46 and 47 have a decreasing diameter in the sequence named, and the shank 48 has portions 48a, 48b and 48c of similarly decreasing diameter in the regions where it engages these openings. The shank portion 48a is formed as a pyramid, for example, so that it can move axially relative to the rotary member 44 while it rotates integrally therewith. Accordingly, the through-opening 45 has a configuration conforming to the profile of the shank portion 48a. The periphery of the rotary member 44 has a cylindrical input display 50 secured thereto which is extended toward the frame 36 so as to overlie the outer periphery thereof, the display abutting against the end face of a flange 36a of the frame 36. Inside the frame 36, one end of an arm 51 is passed through the shank portion 48c and is urged by a securing spring 52 which is passed through the shank portion 48c against a step which is formed between the shank portions 48c and 48b. The shank portion 48c is also pyramidal in cross section and rotates integrally with the arm 51. A washer 54 is disposed on the shank portion 48b so as to be interposed between the arm 51 and the end plate 40. An operator 55 projecting toward the substrate 38 is attached to the free end of the arm 51. A cap 56 is disposed over a key body 43a which extends from the shank portion 48a. A coiled spring 57 is disposed on the shank portion 48a inside the cap 56 so as to extend between the key body 43a and the rotary member 44. An annular groove 58 is formed in the end face of the rotary member 44 in opposing relationship with the marginal edge of the cap 56, and receives a portion of the cap 56. Since the end face of the display 50 secured to the rotary member 44 is in abutting engagement with the flange 36a of the frame 36, the key 43 is biased by the spring 57 in a direction to be disengaged from the rotating member 44, but such disengagement is prevented by the engagement of the washer 54, the arm 51 and the spring 52 with the end plate 40.

Since the shank portion 48a rotates integrally with the rotary member 44, as the key 43 is rotated, the rotary member 44 and the display 50 also rotate integrally. In this manner, the angular position of the operator 55 can be selected, and the depression of the key 43 toward the rotary member 44 causes a displacement of the operator 55 toward the substrate 38. To permit a positioning of the operator 55 at a selected angular position and to permit a user to feel such positioning, the end plate 40 is formed with an array of a plurality of small openings 60 which are spaced apart at an equiangular interval and which are concentric with the shank portion 48. A recess 61 is formed in the rotary member 44 at a position which can be brought into alignment with the openings of the array, and a coiled spring 62 and a ball 63 are received within the recess 61, the ball 63 being urged toward the small opening 60. As the rotary member 44 is rotated to bring the recess 61 into alignment with one of small openings 60, the ball 63 is partly received in that opening 60, and when the rotary member 44 is rotated by an angular increment, the ball 63 will be retracted into the recess 61 against the resilience of the spring 62.

Figure 5:
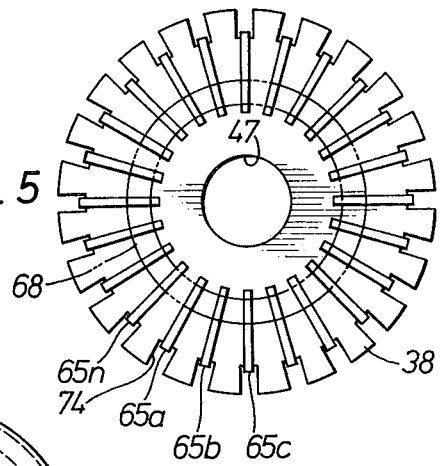
FIG. 5 is a plan view of the insulating substrate.
Figure 6:
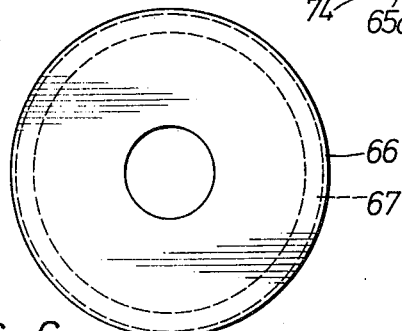
FIG. 6 is a plan view of the insulating film.

By depressing the key 43 when the ball 63 is located in one of the openings 60, the operator 55 controls one of a plurality of switches which are formed on the face of the printed substrate 38 which faces the end plate 40, as shown in FIG. 5. Specifically, a plurality of radially extending stationary contacts 65a to 65n are deposited by conventional techniques known in the art of printed wiring. A flexible film 66 of a synthetic resin material is disposed in opposing relationship with the stationary contacts, and has an annular movable contact 67 deposited on its surface nearer the stationary contacts, in a concentric manner with the shank portion 48c. To prevent the movable contact 67 from normally engaging the stationary contacts 65a to 65n, an annular spacer 68 of an insulating material is secured to the substrate 38 at a position which is radially inside the movable contact 67. It will be seen that the movable contact 67 and the plurality of the stationary contacts 65a to 65n form a plurality of switches. It will be seen that the angular intervals between the stationary contacts 65a to 65n correspond to the angular intervals between the small openings 60 formed in the end plate 40. When the ball 63 is located partly engaged with one of the openings 60, the operator 55 will be situated so as to be aligned with one of the stationary contacts 65a to 65n through the film 66 and the movable contact 67. Thus, the depression of the key 43 causes the operator 55 to move a localized area of the movable contact 67 against one of the stationary contacts, through the interposition of the film 66. A rotation of the key 43 is effective to selectively bring any one of the stationary contacts 65a to 65n into electrical engagement with the movable contact 67. When the key 43 is released, the key 43 returns under the action of the spring 57, whereby the stability of the film 66 causes the movable contact 67 to be disengaged from the stationary contact with which it has been in contact.

The described key input section 6 is mounted within the case 1 shown in FIGS. 1 to 3. More particularly the end of the case 1 which receives the key input section 6 is formed as an annular mount 70 which is secured in place by being screwed into the case body. At its end remote from the pen point 3, the mount 70 is internally formed with a peripheral flange 72 which is externally engaged by the flange 36a of the frame 36 of the key input section so as to hold it in place in abutting engagement with the end face of the wiring board 7. As shown in FIG. 5, the printed substrate 38 is peripherally formed with a plurality of notches 74 which are aligned with the respective stationary contacts, and lead wires 75 (FIG. 4) connected with the respective stationary contacts are passed through these notches for connection with the arithmetic unit 8. While not shown, the movable contact 67 is similarly connected through a lead wire with the arithmetic unit 8. The stationary contacts 65a to 65n can be assigned numbers from 0 to 9 and functions such as addition, subtraction, multiplication, division, equality, clear and the like. In a corresponding manner, the peripheral surface of the input display 50 is marked with indicia 77 representing numerals from 0 to 9 and functions such as +, −, as shown in FIG. 1. The case 1 is marked with an index 78 for cooperation with these indicia. In FIG. 1, the index 78 is formed by a pointed end of the clip 5 at which it is secured to the case. When one of the indicia 77, for example, 3, is aligned with the index 78 and the key 43 depressed, the numerical information 3 is inputted into the arithmetic unit 8, thus achieving a one-to-one correspondence between the indicia 77 and the stationary contacts 65a to 65n.

With the writing instrument according to the invention, the single key 43 of the key input section 6 may be rotated to select an input information, and then the key 43 may be depressed to input the selected information. Since a common key is used for a variety of input informations, the key input section 6 can be minimized in size so as to permit an electronic calculator to be internally housed within the writing instrument. It can be conveniently carried about just like a fountain pen or a roll ball-point pen. The provision of the detent mechanism comprising the ball 63 and the openings 60 permits a correct and rapid registration with the angular position of an intended information to be inputted, thus increasing the speed with which an arithmetic operation can be performed. The result of the arithmetic operation can be immediately recorded with the pen point 3 of the writing instrument. By providing the display 9 nearer the key input section 6 than the pen point 3, the result of the arithmetic operation indicated within the display 9 can be readily viewed while holding the case 1 in a position for writing with the pen point 3, without the sight being hindered by the hand which holds the case 1.

While in the above described embodiment, the key 43 is separate from the rotary member 44 and the display 50, they can be formed integrally as shown in FIGS. 7 and 8. In these Figures, parts corresponding to those shown in FIGS. 1 to 6 are designated by like reference characters. The key 43 is integrally formed with the display 50, and the detent mechanism comprises an arm 80 which is passed through the shank portion 48a and which is formed with a pair of tabs 81, 82 corresponding to the ball 63 of the previous embodiment, at its extremities. These tabs are adapted to be partly engaged with the small openings 60. The coiled spring 57 is disposed on that portion of the shank portion 48a which extends between the arm 80 and the end plate of the display 50. To prevent an unintended withdrawal of the key 43, a peripheral flange 83 is integrally formed between the shank portions 48b and 48c, and engages with the end plate 40.

Figure 9:
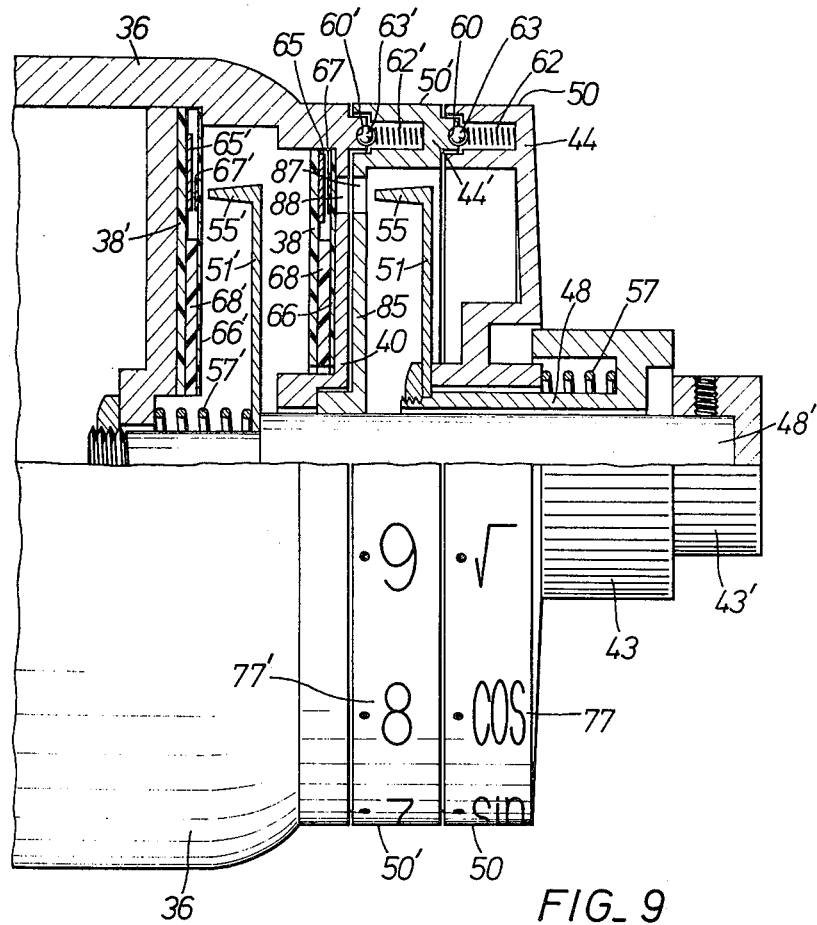
FIG. 9 is a plan view, partly in section, of a further example of the key input section.
Figure 10:
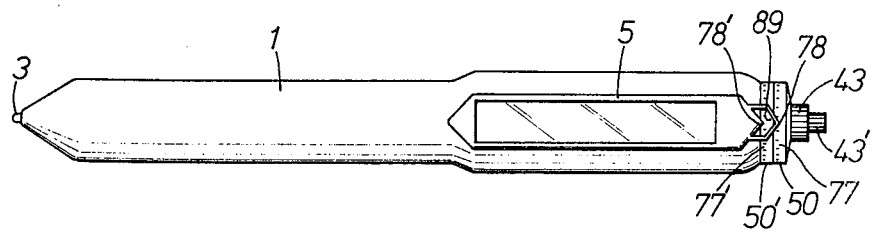
FIG. 10 is a plan view of the writing instrument with the electronic calculator which incorporates the key input section shown in FIG. 9.

As the number of informations to be inputted increases, their indicia 77 will become smaller, rendering it difficult to view them. In consideration of this fact, an arrangement may be used as shown in FIG. 9 which shows a cross section of one-half of the assembly. A shank 48′ is rotatably disposed within the key 43 along its axis, and has its outer end provided with a key 43′ while its inner end which projects from the insulating substrate 38 may be provided with an arm 51′. An operator 55′ is attached to the arm 51′, and disposed in opposing relationship with the circular path of travel of the operator is an array of a plurality of switches which comprises a wiring substrate 38′, a plurality of stationary contacts 65′a to 65′n, a film 66′ and a movable contact 67′. The shank 48′ is urged outward by a coiled spring 57′ which is disposed between such projecting portion and the wiring substrate 38′. A second rotary member 44′ is disposed between the frame 36 and the rotary member 44, and is in the form of a hollow cylinder having a short axial length. The rotary member 44' is integrally formed with a coupling plate 85 toward the frame 36, which coupling plate is axially movable relative to the shank 48', but rotates integrally therewith so that a rotation of the key 43' causes a rotation of a display 50'. On its outer periphery, the display 50' is provided with indicia 77' which represent information to be inputted. A detent mechanism comprising a coiled spring 62', a ball 63' and openings 60' is disposed in the opposite surfaces of the display 50' and the periphery of the frame 36. The coupling plate 85 and the end plate 40 are formed with openings 87, 88 so that the switches on the substrate 38 may be controlled by the operator 55' as the latter moves in response to an operation of the key 43. As shown in FIG. 10, a window 89 is formed in the extension of an index 78 associated with the indicia 77, which extends from the case 1, so as to permit the indicia 77' to be viewed through this window. Another index 78' is formed within the window 89 for cooperation with the indicia 77'.

To help facilitate viewing of the indicia 77, a gear 90 may be mounted on the shank 48 of the key 43 as shown in FIGS. 11 to 13. A shaft 91 which is held parallel to the shank 48 carries a gear 92 which has a smaller diameter than that of the gear 90 and meshes therewith. The shaft 91 also carries a sprocket wheel 93 thereon. An endless display tape 50 is disposed to extend along a zigzag path around the shank 48 and the shaft 91, which path is defined by a plurality of guide pins 94 extending parallel with the latter. The tape is lengthwise formed with sprocket holes 95, which engage the sprocket wheel 93. The display tape 50 is provided with indicia 77 along its length. A display window 97 is formed in the frame 36 at a position opposite to the display tape 50. Some of the pins 94 are arranged such that a portion of the display tape 50 extends along the inner surface of the frame 36 in the region of the window 97 so that only one of the indicia 77 can be viewed through the window 97 from the exterior. A rotation of the key 43 also causes the display tape 50 to rotate, whereby one of the indicia which corresponds to the particular switch selected by the operator 55 will be indicated within the display window 97.

While in the above description, the switches in the key input section 6 have been disposed in concentric manner with respect to the shank, these switches may be disposed in a rectilinear array. As shown in FIG. 14, the case 1 is lengthwise formed with an elongate slot 100 in which the key 43 is disposed for movement along the length thereof. The key input section 6 controlled by the key 43 is housed within the case 1. As shown in FIGS. 15 to 17, a parallel piped metallic frame 101 has its bottom closed by a wiring substrate 38, and a guide opening 102 is formed lengthwise in the top panel of the frame 101. A retaining member 103 of an insulating material is held in the guide opening 102 for movement along the length thereof. The retaining member 103 is formed with a through-opening 105 in which the shank 48 of the key 43 is passed, with the key 43 being attached to the outer end of the shank. Inside the frame 101, a pair of spaced support pieces 106, 107 extend from the retaining member 103 toward the substrate 38, and a leaf spring 108 of a material such as phosphor bronze extends therebetween. An opening 109 is formed in the lower end face of the shank 48 and receives a coiled spring 110 in a manner such that the axis of the spring is substantially at right angles to the substrate 38. The lower end of the leaf spring 108 is positioned in a recess which is formed by stamping the leaf spring to form a projection 111 extending toward the substrate 38. The springs 108, 110 bias the key 43 outward, and the withdrawal of the shank 48 from the retaining member 103 is prevented by the provision of a portion of an increased diameter thereof. An array of a plurality of stationary contacts $65a$ to $65n$ are formed on the substrate 38 so as to extend in a direction perpendicular to the length thereof. A pair of spacers 68, 68' are disposed along the length of the substrate 38 at positions which are on the opposite sides of the projection 111, and a flexible insulating film 66 extends over and across the pair of spacers. In the region between the pair of spacers 68, 68', a band-shaped movable contact 67 is deposited on the surface of the film 66 which is located nearer the substrate 38.

The key input section 6 thus constructed is placed within the case 1 of FIG. 14, with the key 43 projecting through the elongate opening 100 therein. The top panel of the case 1 is provided with indicia 77 indicating information to be inputted and which are distributed along the elongate opening 100. An index member 78 extending from the key 43 cooperates with these indicia. By moving the key 43 to bring the index member into alignment with one of the indicia 77 and depressing the key 43 into the case 1, the leaf spring 108 is urged by the coiled spring 110, whereby the projection 111 thereof causes a localized area of the movable contact 67 to bear against one of the stationary contacts $65a$ to $65n$ through the film 66, thus inputting information associated with the aligned indicia 77. While not shown, a detent mechanism comprising a ball, a coiled spring and a recess, as mentioned above, may be provided intermediate the retaining member 103 and the frame 101 for correctly positioning the key at the respective indicia 77. The display 9 associated with the arithmetic unit may be located at a position which is offset from the clip 5.

Having described the invention, what is claimed is:

1. A writing instrument provided with a miniature electronic calculator, comprising:
   an elongated case;
   a pen member housed in said case adjacent one end thereof:
   an input structure mounted in said case for selectively generating information in the form of an electrical signal;
   an arithmetic unit housed in said case and comprising means responsive to said information from said input structure to perform an arithmetic operation;
   display means coupled to said arithmetic unit and visible from the exterior of said case for displaying the result of said arithmetic operation; and
   a power source housed in said case for energizing said arithmetic unit and said display means;
   said input structure including:
   a key manually manipulable from the exterior of said case at the end of said case opposite to said pen member, said key being mounted for rotation about an axis parallel to the longitudinal axis of said case, and said key also being movable along its said axis of rotation
   said key including a shank extending along said axis of rotation;

an operator mounted on the shank of said key and extending in the radial direction thereof, whereby rotation of said key causes said operator to move along a circular path;

switching means comprising a plurality of switches disposed about the shank of said key in opposing relationship to the circular path of movement of said operator, different ones of said plurality of switches being selectively brought into alignment with said operator in accordance with the rotational angular position of said key whereby subsequent movement of said key along its axis of rotation controls a selected one of said switches to input information corresponding to said selected one of said switches into said arithmetic unit;

means for biasing said key in a direction away from said switches;

said key input structure including information indicating means having indicia indicative of the information which is to be inputted by said plurality of switches, said indicia being positioned in corresponding relation to the respective rotational angular positions of said key.

2. The writing instrument of claim 1 wherein said input structure further comprises a detent mechanism which includes a first part rotatable with rotation of said key and a stationary second part disposed adjacent said first part in concentric relation to the shank of said key;

one of said parts defining a plurality of positioning recesses located in spaced relation to one another;

and engaging members extending from the other of said parts in opposing relationship to said recesses, means for resiliently biasing said engaging members toward said recesses, whereby said engaging members are sequentially moved by the rotation of said key into engagement with said recesses, the rotational angular position of said key when said engaging members are in engagement with said recesses being selected to be a position where information can be inputted, thereby permitting a user to feel the position of said key at which particular information is to be inputted.

3. The writing instrument of claim 1 wherein said switching means comprises:

an insulating substrate disposed at right angles to the shank of said key;

a plurality of stationary contacts formed on said insulating substrate and extending in a radial array about the axis of rotation of said key;

a flexible insulating film disposed in opposing relationship to said insulating substrate adjacent to but spaced from said stationary contacts;

a movable contact deposited on said flexible insulating film to extend in the direction of said array in opposing relationship thereto; and a spacer interposed between said insulating substrate and said flexible insulating film to prevent said movable contact and said stationary contacts from normally engaging one another;

said operator being located on the side of said insulating film opposite to said stationary contacts and being moved along a circular path corresponding to the disposition of said movable contact upon rotation of said key, depression of said key along said axis of rotation against the force of said biasing means at the position indicated by a selected one of said indicia being operative to urge said movable contact against the one of said stationary contacts which corresponds to said selected indicium, and subsequent release of said key being operative to cause said biasing means to restore said key and said operator to their original positions and to effect disengagement of said movable contact from said stationary contact due to the restoring force of said flexible insulating film.

4. The writing instrument of claim 3 which further includes:

second switching means comprising a second insulating substrate disposed parallel to and spaced from said insulating substrate, and a plurality of switches formed on said second insulating substrate in concentric array about the shank of said key;

a second key mounted on a second shank coaxial with the shank of said key; and a second operator mounted on said second shank for selectively controlling the plurality of switches of said second switching means.

5. The writing instrument of claim 1 wherein said input structure further includes:

a rotary member interposed between said key and a plate at the end of said case opposite to said pen member, said shank of said key extending through said rotary member;

means for engaging said rotary member and the shank of said key to one another in the direction of their rotation, said engaging means being constructed to permit axial motion of said rotary member and shank relative to one another;

a coil spring wound about the shank of said key and engaging said rotary member to provide said biasing means;

a key retaining member mounted on the shank of said key adjacent said end plate; and an index for indicating a selected one of said indicia, said indicia being provided on one of the peripheral surface of said rotary member and the peripheral surface of said case adjacent thereto and said index being provided on the other peripheral surface.

6. A writing instrument provided with a miniature electronic calculator, comprising an elongated case having a writing member mounted at one end thereof, an arithmetic circuit housed in said case, said arithmetic circuit comprising means for performing an arithmetic calculation in response to electrical input signals coupled thereto and for generating electrical output signals representing the results of said calculation, electrical display means carried by said case and responsive to said output signals for providing a visible indication of said results, and a key input structure supported by said case for producing said electrical input signals, said key input structure comprising a manually manipulable key mounted for movement in two mutually transverse directions, operator means coupled to said key for movement therewith, said operator means being moved along a first predetermined path when said key is moved in one of said directions and being moved along a second path transverse to said first path when said key is moved in the other of said directions, electrical switching means comprising a plurality of switches disposed in spaced relation to one another in an array distributed parallel to said first predetermined path whereby movement of said key in said one of said directions is operative to move said operator means to a position adjacent any selected one of the switches in said array, resilient means for applying an elastic force to said operator means acting thereon away from said switching means in said other of said directions for maintaining said operator means in spaced relation to each of said switches when said operator means is being moved in said one of said directions, said key means being responsive to a manual force applied thereto in said other of said directions to overcome the force of said resilient means to cause said operator means to engage a selected one of the switches in said array thereby to provide an electrical input signal to said arithmetic unit, and indicia means carried by said key input structure and positionally coordinated with the possible positions of said operator means as it is moved along said first predetermined path for indicating the information which is supplied to said arithmetic unit when said operator means is caused to engage different selected ones of the switches in said array.

7. The writing instrument of claim 6 wherein said first predetermined path is a circular path, said second path extending through the center of said circular path.

8. The writing instrument of claim 7 wherein said circular path is coaxial with the axis of elongation of said case, said manually manipulable key projecting outwardly of said case at the other end of said case.

9. The writing instrument of claim 6 wherein said first predetermined path is a straight line extending in the direction of elongation of said case.

10. The writing instrument of claim 9 wherein said key input structure includes a parallelepiped frame; an insulating substrate at the bottom of said parallelepiped frame; a retaining member held in a guide opening formed in an upper panel of said parallelepiped frame in its lengthwise direction and movable along said guide opening; said key extending through an opening in said retaining member to project outwardly of said case; said plurality of switches being formed on said insulating substrate with said array extending in the lengthwise direction of said frame.

* * * * *